United States Patent Office 3,471,255
Patented Oct. 7, 1969

3,471,255
METHOD FOR PRODUCING BORIC OXIDE
Robert W. Sprague, Santa Ana, Calif., assignor to United States Borax & Chemical Corporation, Los Angeles, Calif., a corporation of Nevada
No Drawing. Filed Aug. 25, 1967, Ser. No. 663,250
Int. Cl. C03c *3/00;* C01b *35/00;* C01d *5/02*
U.S. Cl. 23—149                9 Claims

ABSTRACT OF THE DISCLOSURE

Vitreous boric oxide is produced by heating an intimate admixture of sodium bisulfate and alkali metal or alkaline earth metal borate to an elevated temperature to form a two-layer molten reaction product mixture. The layers are separated while molten and boric oxide obtained as the upper layer.

---

This invention relates to the production of boric oxide, and more particularly, this invention relates to a method for producing vitreous boric oxide directly from metal borate and sodium bisulfate.

Boric oxide finds many uses in industry, especially in applications in which a high $B_2O_3$ content material, containing little or no oxides of the alkali or alkaline earth metals, is desired. Thus, boric oxide is used in the production of many glass compositions, enamels, alloys, in the preparation of fluxes, and as a catalyst in organic reactions.

The present invention provides a facile method for producing a vitreous boric oxide product directly from low-cost raw materials. The resultant boric oxide product has a high $B_2O_3$ content of at least about 90% and is therefore especially useful for applications requiring a high $B_2O_3$ content material associated with a low amount of alkali or alkaline earth metal oxide. The present method also provides valuable alkali metal or alkaline earth metal salts as by-products.

The method provided by this invention comprises intimately mixing sodium bisulfate ($NaHSO_4$) and a metal borate selected from the group consisting of the alkali and alkaline earth metal borates to form a feed mixture, heating said feed mixture to an elevated temperature, such as at least about 850° C., to form a two-layer molten reaction product mixture, separating said layers while molten and cooling said separated layers to obtain vitreous boric oxide as a solid, fused product. The corresponding alkali or alkaline earth metal sulfates are obtained as valuable by-products.

The feed for the present process is prepared by intimately mixing sodium bisulfate with one or more of the metal borates, preferably in a bisulfate:borate mole ratio of at least about 2:1. A bisulfate:borate mole ratio of from about 2:1 to 3:1 is presently preferred for best yields of the desired boric oxide product when sodium tetraborate is used, but up to about 6:1 can be employed in the case of the calcium borate, colemanite $$(2CaO \cdot 3B_2O_3 \cdot 5H_2O)$$

The metal borates useful in the present process are the alkali metal borates, the alkaline earth metal borates, or mixtures thereof. Examples of such borates include sodium tetraborate ($Na_2B_4O_7$), potassium tetraborate, sodium pentaborate, and the hydrates thereof, as well as the borate ores such as colemanite ($Ca_2B_6O_{11} \cdot 5H_2O$), ulexite ($NaCaB_5O_9 \cdot 8H_2O$), and mixtures of refined or unrefined borates. Due to economics and ready availability, the preferred borate reactants are sodium tetraborate and its hydrates, such as sodium tetraborate pentahydrate and sodium tetraborate decahydrate (borax).

The presently preferred borate is sodium tetraborate pentahydrate.

In a preferred embodiment of this invention, sodium bisulfate and a hydrated sodium tetraborate, such as the pentahydrate, in a mole ratio of about 2–3:1 are combined in a mixing vessel at about ambient temperature. A ball-mill is an example of a suitable mixing device. The reactants are intimately mixed to provide a homogeneous mixture of reactant feed. If desired, a small amount of water can be added to the reactants during mixing in order to facilitate forming a homogeneous combination.

The feed mixture can be fed to a furnace, such as a gas-fired furnace, wherein the mixture is heated at an elevated temperature of at least about 800° C. and, preferably in the range of from about 900° to about 1100° C. The reaction mixture forms two molten layers with molten boric oxide comprising the upper layer and molten sodium sulfate comprising the lower layer. The molten layers are separated preferably soon after formation, that is less than about 1–2 hours after being fed to the furnace. Although longer retention times can be used, it is generally preferred to separate the two layers soon after formation since it appears that the amount of alkaline impurities in the boric oxide increases with longer periods of contact between the two layers.

Separation of the two molten layers can be obtained by the use of dams or weirs on the furnace floor; however, the present process is not restricted to this means of separating the layers since other techniques would be applicable and are well known to those skilled in the art.

Preferably, after separation of the two molten layers, the boric oxide layer is retained in the furnace for a longer period of time, such as up to about 1–2 hours, or longer if desirable, and heating of the layer continued at about the reaction temperature or higher.

After separation, each layer is discharged separately from the furnace and cooled to provide the solid $B_2O_3$ product and by-product salt. A particularly useful means for cooling and solidifying the molten product is to feed the molten materials directly to chilled rolls. The product solidifies on the roll, falls off or is scraped off, is then cooled and crushed to the desired size to provide a fused, glassy boric oxide product. The by-product salt can be cooled and solidified in a similar manner.

The vitreous boric oxide product obtained by the present method has a high $B_2O_3$ content, usually in excess of about 90% and, when sodium tetraborate is employed as a reactant, generally about 95% $B_2O_3$.

The method of this invention is readily adapted to a continuous process in which the feed mixture is continuously fed to a furnace and the molten products are continuously withdrawn from the furnace and cooled to provide the solid products.

The invention is illustrated by the following examples but it is not to be considered restricted to the specific examples given.

Example I

Sodium tetraborate pentahydrate (164.4 grams) and sodium bisulfate (135.6 grams) were intimately mixed by ball-milling together for about 7 hours. A 100 gram sample of this mixture was heated in a platinum crucible in a furnace at a temperature of 1000° C. for 20 minutes. The upper layer was separated and cooled to give a glassy product which contained 90.4% $B_2O_3$ and 6.8% $Na_2O$.

Example II

Sodium tetraborate pentahydrate (164.4 grams) and sodium bisulfate (157.2 grams) were intimately mixed by ball-milling. A 100 gram portion of this feed mixture was then fused in a platinum crucible at 1000° C. for 20 minutes. The layers were separated to give a glassy product as the upper layer which contained 93.9% $B_2O_3$ and 4.7% $Na_2O$.

Example III

Sodium tetraborate pentahydrate (164.4 grams) and sodium bisulfate (189.3 grams) were intimately mixed in a ball-mill. A 100 gram portion of the feed mixture was heated in a platinum crucible at 1000° C. for 20 minutes, cooled, and the layers separated. Analysis of the upper layer gave 95% $B_2O_3$ and 3.0% $Na_2O$.

Various changes and modifications of the invention can be made and, to the extent that such variations incorporate the spirit of this invention, they are intended to be included within the scope of the appended claims.

What is claimed is:

1. The method for producing vitreous boric oxide which comprises heating an admixture of sodium bisulfate and metal borate, in a molar ratio of at least about 2:1, to an elevated temperature of at least about 800° C. to form a two-layer molten reaction product mixture, separating said layers while molten and cooling said separated layers to obtain vitreous boric oxide of at least 90% $B_2O_3$ as a solid product, said metal borate being selected from the group consisting of the alkali metal and alkaline earth metal borates.

2. The method according to claim 1 in which said admixture is heated to a temperature in the range of from about 900° C. to about 1100° C.

3. The method according to claim 1 in which said metal borate is hydrated sodium tetraborate.

4. The method according to claim 3 in which said admixture of sodium bisulfate and sodium tetraborate are in a molar ratio of about 2–3:1.

5. The method according to claim 1 in which said metal borate is sodium tetraborate pentahydrate.

6. The method for producing vitreous boric oxide which comprises heating an admixture of sodium bisulfate and sodium tetraborate in a molar ratio of about 2–3:1 to an elevated temperature of at least about 800° C. to form a two-layer molten reaction product mixture, said boric oxide material being in the upper layer, separating said layers while molten and cooling said separated layers to obtain vitreous boric oxide of at least 90% $B_2O_3$ and sodium sulfate as solid products.

7. The method according to claim 6 in which said sodium tetraborate is sodium tetraborate pentahydrate.

8. The method according to claim 6 in which said admixture is heated to a temperature in the range of from about 900° C. to about 1100° C.

9. The method according to claim 6 in which said upper layer of molten boric oxide is heated after separating said layers, thereby removing gaseous impurities.

References Cited

UNITED STATES PATENTS 1,927,013  9/1933  Cramer et al. _____ 23—149

FOREIGN PATENTS 6,601,819  8/1966  Netherlands.

OTHER REFERENCES

Slavyanskii, pages 1 to 8 of translation of "Zhurnal Fizicheskoi Khimii," vol. 30, No. 9, 1956, pp. 2046–2050.

Slavyanskii, pages 1 to 7 of translation of "Zhurnal Fizicheskoi Khimii," vol. 30, No. 10, 1956, pp. 2248–2250.

HERBERT T. CARTER, Primary Examiner

U.S. Cl. X.R.

23—121, 122; 106—47